United States Patent [19]

Collins

[11] Patent Number: 4,962,784

[45] Date of Patent: Oct. 16, 1990

[54] TOP BREAK VALVE DEVICE AND SYSTEM

[76] Inventor: Kirk C. Collins, 102 SW Ave. E, Seminole, Tex. 79360

[21] Appl. No.: 475,539

[22] Filed: Feb. 6, 1990

[51] Int. Cl.⁵ ............................................ F16K 43/00
[52] U.S. Cl. .................... 137/15; 29/402.08;
29/890.124; 73/201; 73/431; 137/68.1;
137/315; 138/97; 285/2; 285/30; 403/2
[58] Field of Search ................ 73/198, 199, 201, 431;
137/15, 68.1, 315, 317, 797; 138/97; 29/157 R,
157 T, 402.01, 402.08; 220/89 A; 285/2, 3, 4,
18, 30; 403/2

[56] References Cited

U.S. PATENT DOCUMENTS

| 245,438 | 8/1881 | Boyd . | |
|---|---|---|---|
| 429,067 | 5/1890 | Simmons . | |
| 595,437 | 12/1897 | Greenfield . | |
| 1,495,946 | 5/1924 | Bassett | 285/2 |
| 2,054,118 | 9/1936 | Childs et al. | 29/148.2 |
| 2,067,028 | 1/1937 | Talaga | 285/30 |
| 2,251,031 | 7/1941 | Bozeman, Jr. | 19/141 |
| 2,505,456 | 4/1950 | Beecher | 137/68.1 |
| 2,540,900 | 2/1951 | McCool | 285/146 |
| 2,945,503 | 7/1960 | Atkinson | 137/68.1 |
| 3,296,861 | 1/1967 | Mueller et al. | 73/201 |
| 3,512,317 | 5/1970 | Lynch | 137/68.1 |
| 3,618,626 | 11/1971 | Russo | 137/68.1 |
| 3,635,500 | 1/1972 | Kirby | 285/115 |
| 3,746,371 | 7/1973 | Leopold, Jr. et al. | 73/201 |
| 3,899,196 | 8/1975 | Dashner | 285/2 |
| 4,407,527 | 10/1983 | Reimert | 285/27 |
| 4,562,852 | 1/1986 | Britt | 137/68.1 |
| 4,716,937 | 1/1988 | Hendrickson | 285/2 |

Primary Examiner—George L. Walton
Attorney, Agent, or Firm—Marcus L. Bates

[57] ABSTRACT

A valve device for use in a gas flow system which has a gas meter connected to a supply line. The valve device is especially made to break the threads of a riser pipe nipple that is screwed into the top outlet end. The valve device has an annular shoulder at the inlet and outlet ends and a passageway extends through the valve device and through the shoulders. A length of the outlet end of the passageway has internal threads at the outlet end that terminate at the shoulder. A smooth cylindrical marginal length of the inlet length of the passageway is spaced from a threaded portion of its length located intermediate the smooth part of the passageway and the valve element. The smooth cylindrical length has an inside diameter slightly greater than the outside diameter of the supply line so that a lateral load placed on the supply line is transferred into the valve device through the smooth part of the passageway and avoids breaking the supply line threads. When the system is impacted by a moving object, such as a vehicle, the piping of the system will preferentially break at the nipple located in the outlet threads while the pipe that is screwed to the inlet threads remains connected so that the valve element can be moved to the closed position to shut off the flow of gas from the broken system.

15 Claims, 1 Drawing Sheet

TOP BREAK VALVE DEVICE AND SYSTEM

BACKGROUND OF THE INVENTION

Natural gas is one of the most economical and convenient means by which hydrocarbon energy can be used for commercial and domestic heating. It is also used as a fuel for internal combustion engines. The gas must be conveyed by pipelines and it is customary to bury the pipelines adjacent roadways and alleyways. The supply line is connected to a lateral by a gas meter. The lateral is connected to a home or a gas engine and the gas meter measures the quantity of gas consumed so that the utility company can be compensated for the quantity of gas that flows from the main supply line.

A riser usually is connected to the main supply line and extends above the ground level to a gas valve which controls the flow of gas to the gas meter. Occasionally, for one reason or another, a negligent vehicle operator will run into the gas meter and this usually breaks one of the pipes that makes up the riser leading from the underground supply pipe to the gas meter. The riser usually breaks at the threaded pipe connection between the supply pipe and the valve. When this happens, it is impossible for the layman to shut off the flow of gas because the valve is located downstream of the broken pipe. Accordingly, gas escapes from the riser and into the atmosphere until an expert from the utility company arrives to shut off the gas flow. The escape of gas into the atmosphere brings about a costly and dangerous situation.

It would therefore be desirable to be able to provide a gas flow measuring system having a gas meter positioned above the ground and connected to a gas supply pipe by piping that includes a special valve device therein that always causes the piping to break at a location downstream of the valve rather than upstream of the valve. By selecting the location in the piping system where the break will usually occur provides a means by which anyone can turn the existing valve to the off position and thereby obviate the waste of the gas and the danger of explosion.

Apparatus that achieves the above desirable attributes is the subject of the present invention.

SUMMARY OF THE INVENTION

This invention comprehends both method and apparatus by which the piping used in a gas flow measuring system selectively fails at a predetermined location therein.

More specifically, the present invention comprehends a top break valve device for use in a flow system wherein the valve device, when impacted by a moving object, breaks at an outlet side thereof as contrasted to the inlet side thereof.

Still more specifically, the present invention comprehends a valve device for use in a flow system. The valve device has an inlet end opposed to an outlet end with there being a passageway extending therebetween and a valve element in said passageway for controlling flow therethrough. The valve element divides the passageway into an inlet length and an outlet length. The outlet length is threaded at the marginal outlet end thereof and receives a threaded pipe nipple therein. The inlet length of the passageway has a smooth cylindrical marginal length at the marginal inlet end thereof and a threaded marginal length between the smooth cylindrical part and the valve element. A riser pipe threadedly engages the inlet threads and connects the valve to a supply pipe.

When the valve device is impacted by a moving object, a break in the piping will occur at the outlet threads of the valve device rather than the inlet threads thereof because the structural integrity provided by the configuration of the inlet part of the valve passageway as opposed to the structural integrity provided by the outlet part of the valve passageway.

A primary object of the present invention is the provision of a valve device having a valve element therein that divides a flow passageway thereof into an inlet and outlet part having a configuration that threadedly accepts piping attached to the inlet and outlet of the valve device to preferentially break at the threaded outlet part as opposed to the threaded inlet part.

Another object of this invention is the provision of a top break valve device having an inlet part and an outlet part, wherein a pipe attached at the outlet part preferentially breaks as compared to a pipe connected at the inlet part.

A still further object of this invention is the provision of a selective break gas piping system that includes a valve device in combination with a gas meter and pipping therefor, wherein the piping for the valve device preferentially breaks at an outlet end thereof whenever the system is impacted by a moving object.

An additional object of the present invention is the provision of a method of selecting piping at the downstream side of a valve device to break whenever the valve device is impacted by a moving object and leaving the piping at the upstream side of the valve intact.

These and various other objects and advantages of the invention will become readily apparent to those skilled in the art upon reading the following detailed description and claims and by referring to the accompanying drawings.

The above objects are achieved in accordance with the present invention by the provision of a method for use with apparatus fabricated in a manner substantially as described herein.

DETAILED DESCRIPTION OF THE PREFERRED EMBODIMENT

Figure 1:
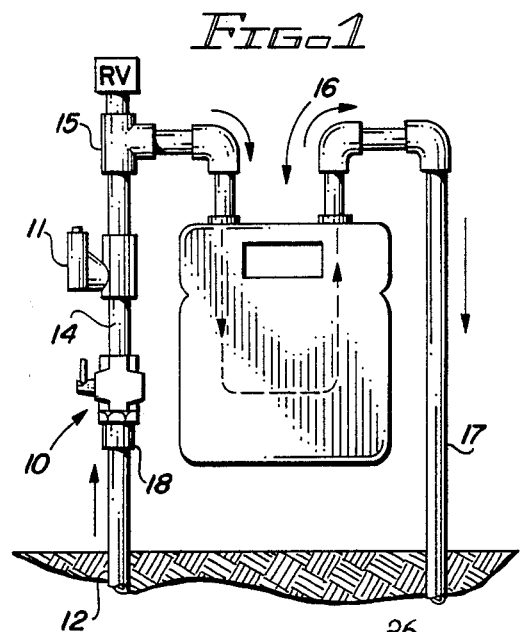
FIG. 1 is a broken, side elevational, part schematical, part diagrammatical view of a gas flow measuring system made in accordance with the present invention.

In FIG. 1 of the drawings, there is disclosed apparatus by which the method of the present invention is carried out. In FIG. 1, numeral 10 indicates a valve device made in accordance with the present invention. A regulator 11 is connected downstream of valve device 10 and a gas supply pipe 12 is connected upstream of the valve device 10. Riser nipple 14 is threadedly attached to the valve device 10 and regulator 11. A relief valve 15 sometime is interposed between gas meter 16 and regulator 11. Numeral 17 indicates the outlet gas supply leading from the meter 16 to the point of usage.

FIGS. 2-5 illustrate the details of the valve device 10 made in accordance with the present invention. As particularly seen in FIG. 2, a smooth bore extension 18 provides an inlet marginal end for the valve device 10. The extension 18 terminates in a shoulder 20 of annular configuration that defines the valve inlet. The extension 18 receives the smooth wall surface 22 of supply pipe 12 therewithin. The interior 23 of the extension 18 is a smooth cylindrical bore having an inside diameter that snugly receives the outside diameter 22 of the supply pipe 12 and therefore, the inside diameter of the smooth bore 23 is slightly larger than the outside diameter of wall surface 22 of supply pipe 12. The term "slightly larger" is intended to mean a tight slidable fit that will admit the marginal upper end of supply pipe 12 to be received within extension 18 whereby threaded end 24 of the supply pipe 12 can be threadedly made up with the threaded inlet end 25 of the valve device 10.

Figure 2:
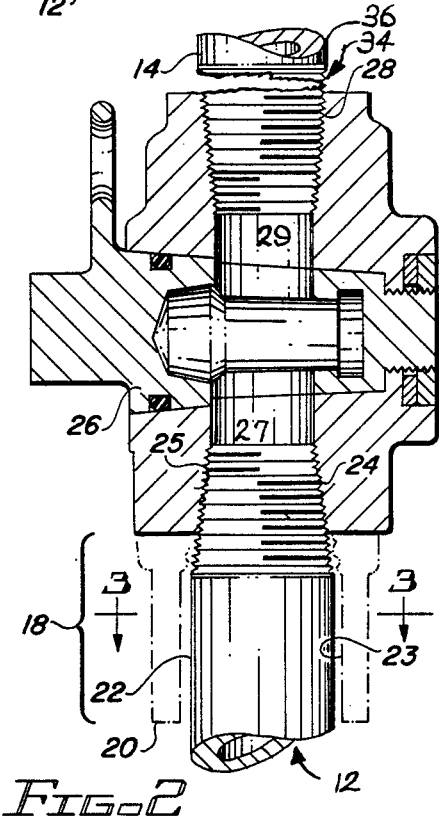
FIG. 2 is an enlarged, longitudinal, part cross-sectional, detailed, isolated view of part of the apparatus disclosed in FIG. 1.
Figure 3:
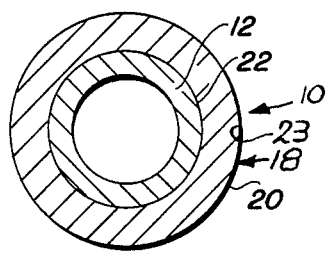
FIG. 3 is a cross-sectional view taken along line 3—3 of FIG. 2.
Figure 4:
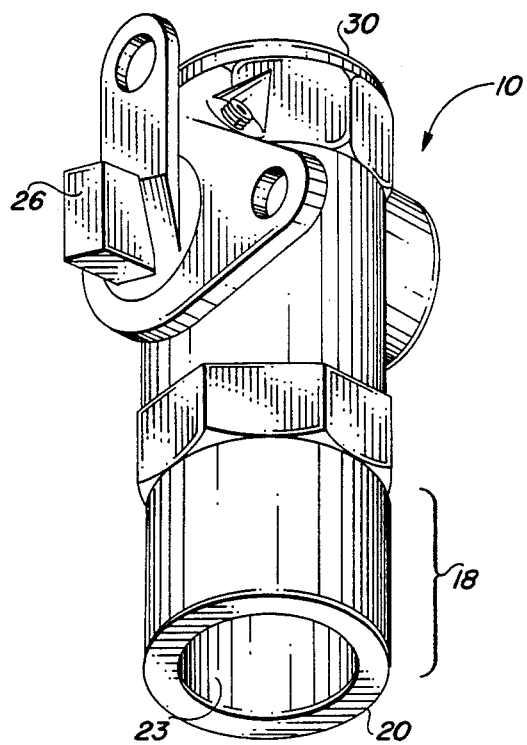
FIG. 4 is a perspective view of the valve device disclosed in the foregoing figures; and, FIG. 5 is a perspective, part cross-sectional view of the apparatus of FIG. 4, with some parts being cut away therefrom, and some of the remaining parts being shown in cross-section.

The (extension) 18 in FIG. 2 is shown in dot-dash to distinguish the prior art solid part of the valve from the improved part of the valve. Elsewhere in the drawings, the valve is shown in solid lines.

Numeral 26 broadly indicates a valve element having the illustrated boss thereon for turning the valve from an opened to a closed position. The outlet marginal end of the valve device receives the threaded end 28 of the before mentioned riser nipple 14 therein in the illustrated manner of FIGS. 1 and 2.

Accordingly, the valve element 26 of the valve device 10 divides the flow passageway that extends through the valve device into an inlet passageway 27 and an outlet passageway 29. The outer marginal length of the outlet passageway 29 is threaded at 32 with the threads extending to the annular outlet shoulder 30.

The inlet passageway 27 of the valve device 10 has the smooth cylindrical bore 23 formed at the marginal inlet end thereof, with there being the before mentioned threaded length 25 formed between the smooth bore part 23 and the valve element 26.

Figure 5:
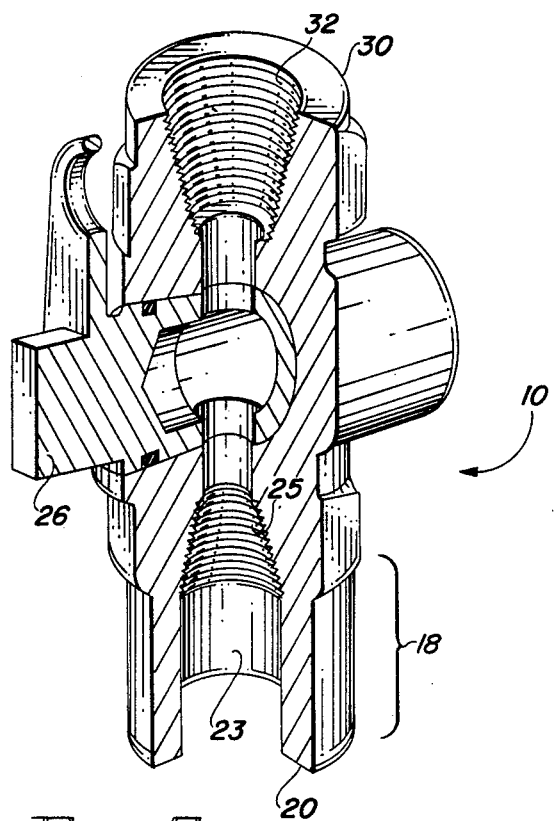

In FIG. 5, numeral 32 illustrates the threads formed in the outlet passageway 29 of the valve body 10. Numeral 34 indicates the area of the threads of the riser nipple 14 that will preferentially break when the gas flow system of FIG. 1 is impacted by a moving object. Numeral 36 indicates the length of the riser nipple 14 that remains intact and connected to the regulator 11 when the riser nipple is broken from the valve device 10, leaving the threaded lower marginal end 28 of the riser nipple 14 fastened to threads 32 of the valve device 10.

In operation, the top break valve device 10 is placed into a gas flow system such as exemplified by the embodiment set forth in FIG. 1 of the drawings. Accordingly, to this invention, it is essential that damage to the gas flow system should occur downstream of the valve device 10, and accordingly, the valve device 10 must be oriented respective to the remainder of the gas flow system with the extension 18 forming the inlet end of the gas valve. Whenever a moving object impacts the gas flow system of FIG. 1, the force of the impact will break the threaded inlet end of the riser nipple 14 in the illustrated manner seen in FIG. 2 at numeral 34. The broken length 36 of the riser nipple will usually remain connected to the downstream piping, leaving the broken threaded inlet end 28 of the riser nipple 14 threadedly engaging the outlet threaded area 32 of the valve device 10. It is a simple matter for one to take any suitable tool and rotate the valve element 26 by hand into the closed position in order to preclude further escape of gas from the supply pipe 12. Next, the gas company's meter man can replace the damaged piping downstream of the valve device 10 by merely using an "easy-out" for removing the broken part 28 of the riser nipple 14, and to then replace the riser nipple using a universal for connecting the piping back into series relationship as illustrated in the drawings.

Those skilled in the art, having digested the present disclosure, will be lead, without further invention, to utilize the top break valve of the present invention in other similar situations where control of a dangerous fluid is desirable.

I claim:

1. A gas flow system that includes a gas meter connected to a supply line by a riser pipe and a valve device which controls flow of gas from the supply line to the gas meter, the improvement comprising:

said valve device has an inlet end and an outlet end, an annular shoulder at the inlet end and an annular shoulder at the outlet end, a passageway formed through said valve device for flow of gas therethrough when said valve device is in an open position; said passageway has opposed ends that terminate at the inlet and outlet shoulders;

a valve element mounted in a medial length of said passageway for controlling flow through said passageway and dividing said passageway into an inlet length and an outlet length; internal threads at the marginal outlet end of said outlet length of said passageway, said threads terminate at said outlet shoulder;

said inlet length of said passageway has a smooth cylindrical marginal length extending from the shoulder at the inlet end for a portion of its longitudinal length along the central axis of the inlet length of the passageway thereby leaving an adjacent length of said passageway that commences at said valve element and terminates at said smooth cylindrical marginal length of said inlet length of said passageway;

said inlet length of said passageway is threaded for a portion of its length intermediate said smooth part of the passageway and the valve element;

said smooth cylindrical length has an inside diameter that is slightly greater than the outside diameter of the riser pipe;

whereby said valve device, when connected in a gas flow system, and impacted by a moving object, such as a moving vehicle, will preferentially break at the riser pipe located in the outlet threads of the valve while the riser pipe located at the inlet threads of the valve device remain intact so that the valve element can be moved to the closed position to thereby shut off the flow of gas from the broken system, and permitting removal of the broken riser and inserting a new riser to enable the valve to be reopened to resume gas flow to the gas meter.

2. The improvement of claim 1 wherein the smooth cylindrical length of said inlet passageway is equal to the threaded length thereof.

3. The improvement of claim 2 wherein the threaded length of the inlet passageway has an inside diameter equal to the inside diameter of the threaded length of the outlet passageway.

4. The improvement of claim 3 wherein said inlet and outlet passageways are axially aligned and said inlet and outlet shoulders are opposed to one another and define the opposed terminal ends of the valve device.

5. The improvement of claim 4 wherein said smooth cylindrical length of said inlet passageway is formed within an annular cylindrical extension that is an integral part of said valve device.

6. A selective top break gas supply piping system that includes a gas meter for measuring gas flow from a supply pipe, a valve device having an inlet at one end thereof and an outlet at another end thereof, a gas inlet pipe, a nipple connected to the valve device, said gas inlet pipe is connected to the inlet of the valve device, said nipple is connected to convey gas from said outlet end of the valve device and to the meter; whereby, gas can flow from said supply pipe, through said gas inlet pipe, through said valve device, through said nipple, and to said gas meter;

a passageway formed through said valve device through which gas can flow, a valve element located intermediate the inlet and outlet ends of said valve device and dividing the passageway into an inlet passageway and an outlet passageway;

means forming threads along a marginal terminal outlet end of said passageway, said threads commence at the outlet end and extend in an upstream direction towards said valve element;

an outer marginal length of said inlet passageway is a smooth cylindrical bore and has an inside diameter slightly greater than the outside diameter of the inlet pipe;

said inlet passageway is threaded for a portion of its length intermediate said smooth cylindrical bore and said valve element; said smooth cylindrical bore extends from the threaded part of the inlet passageway to the inlet end thereof;

whereby said valve, when the outlet thereof is threadedly connected to the riser nipple, and impacted by a moving object, will preferentially break at the riser nipple threads located at the valve outlet threads while the inlet threads of the valve remain intact so that the valve element can be moved to the closed position to thereby enable the flow of gas to be shut off from the broken system, and permitting removal of the broken riser and inserting a new riser to enable the valve to be reopened to resume gas flow to the gas meter.

7. The piping system of claim 6 wherein the smooth cylindrical length of said inlet passageway is equal to the threaded length thereof.

8. The piping system of claim 7 wherein the threaded length of the inlet passageway has an inside diameter equal to the inside diameter of the threaded length of the outlet passageway.

9. The piping system of claim 8 wherein said inlet and outlet passageways are axially aligned and said inlet and outlet shoulders are opposed to one another and define the opposed terminal ends of the valve device.

10. The piping system of claim 9 wherein said smooth cylindrical length of said inlet passageway is formed within an annular cylindrical extension that is an integral part of said valve device.

11. In a gas flow measuring system wherein a gas meter is positioned above the ground and is connected to a supply line by a gas piping system that includes a valve device, the valve device having a valve element therein which controls flow to the gas meter, the method of selecting the downstream side of said valve device for a break that may occur in the gas piping system in response to the gas flow measuring system being impacted by a moving object comprising the steps of:

providing a passageway through said valve device through which gas can flow;

providing threads at opposed marginal ends of said passageway, providing a cylindrical surface at one opposed end with the threads being located intermediate said valve element and the cylindrical surface;

threading said inlet end for only a portion of its length intermediate said cylindrical surface and said valve element;

providing the wall section at the cylindrical surface an inside diameter slightly greater than the outside diameter of the supply line;

whereby said valve, when connected in a riser, and impacted by a moving vehicle, will preferentially break at the outlet threads while the inlet threads remain intact so that the valve element can be moved to the closed position to thereby enable the flow of gas to be shut off from the broken system, and permitting removal of the broken riser and inserting a new riser to enable the valve to be reopened to resume gas flow to the gas meter.

12. The method of claim 11 wherein the smooth cylindrical length of said inlet passageway is equal to the threaded length thereof.

13. The method of claim 12 wherein the threaded length of the inlet passageway has an inside diameter equal to the inside diameter of the threaded length of the outlet passageway.

14. The method of claim 13 wherein said inlet and outlet passageways are axially aligned and said inlet and outlet shoulders are opposed to one another and define the opposed terminal ends of the valve device.

15. The method of claim 14 wherein said smooth cylindrical length of said inlet passageway is formed within an annular cylindrical extension that is an integral part of said valve device.

* * * * *